(12) United States Patent
Hayashi et al.

(10) Patent No.: US 10,391,892 B2
(45) Date of Patent: Aug. 27, 2019

(54) SEAT FOR VEHICLE

(71) Applicant: TACHI-S CO., LTD., Akishima-shi, Tokyo (JP)

(72) Inventors: Shunsuke Hayashi, Tokyo (JP); Norihisa Narita, Tokyo (JP); Tatsuya Iwasaki, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/967,544

(22) Filed: Apr. 30, 2018

(65) Prior Publication Data

US 2018/0361883 A1 Dec. 20, 2018

(30) Foreign Application Priority Data

Jun. 14, 2017 (JP) .................. 2017-117271

(51) Int. Cl.
*B60N 2/20* (2006.01)
*B60N 2/12* (2006.01)
*B60N 2/015* (2006.01)
*A47C 1/024* (2006.01)
*B60N 2/68* (2006.01)

(52) U.S. Cl.
CPC ........... *B60N 2/12* (2013.01); *B60N 2/01516* (2013.01); *B60N 2/20* (2013.01); *A47C 1/024* (2013.01); *B60N 2/68* (2013.01)

(58) Field of Classification Search
CPC .... B60N 2/12; B60N 2/20; B60N 2/68; A47C 1/024
USPC ............... 297/354.1, 452.18, 341, 362.12
See application file for complete search history.

(56) References Cited

U.S. PATENT DOCUMENTS

| | | | | |
|---|---|---|---|---|
| 4,192,545 A * | 3/1980 | Higuchi | ............... | B60N 2/4249 297/216.13 |
| 5,553,922 A * | 9/1996 | Yamada | ............... | B60N 2/2252 297/362 |
| 5,988,756 A * | 11/1999 | Aufrere | ................... | B60N 2/68 297/391 |
| 6,817,672 B2 * | 11/2004 | Matsunuma | ........... | B60N 2/682 297/452.18 |
| 7,887,139 B2 * | 2/2011 | Yamada | ................... | B60N 2/22 297/452.18 |
| 8,267,479 B2 * | 9/2012 | Yamada | ................... | B60N 2/22 297/452.18 |
| 8,459,747 B2 * | 6/2013 | Watanabe | ................ | B60N 2/22 297/452.18 |

(Continued)

FOREIGN PATENT DOCUMENTS

JP 2011-230728 A 11/2011
JP 2012-030632 A 2/2012

*Primary Examiner* — Syed A Islam
(74) *Attorney, Agent, or Firm* — Shapiro, Gabor and Rosenberger, PLLC

(57) ABSTRACT

A seat for a vehicle includes a seat cushion, a seat back, and a reclining device configured to allow the seat back to be tilted to the seat cushion. The seat back includes a back frame having an opening and a pipe frame comprising a pipe member, and the pipe frame includes a distal end part. The lower part of the pipe frame extends through the opening such that the distal end part is located inside a space defined by the back frame and the reclining device, and the lower part of the pipe frame is fixed to the back frame at the opening. Rotation center of the reclining device is set so as to be aligned with axial center of the lower part of the pipe frame.

3 Claims, 3 Drawing Sheets

(56) References Cited

U.S. PATENT DOCUMENTS

| | | | | |
|---|---|---|---|---|
| 8,833,857 B2* | 9/2014 | Hara | ........................ | B60N 2/68 |
| | | | | 297/344.1 |
| 9,174,553 B2* | 11/2015 | Fischer | .................. | B60N 2/682 |
| 2007/0145801 A1* | 6/2007 | Yamada | ................. | B60N 2/236 |
| | | | | 297/369 |
| 2011/0006580 A1* | 1/2011 | Ishimoto | .................. | B60N 2/68 |
| | | | | 297/452.18 |
| 2012/0025579 A1* | 2/2012 | Ono | ........................ | B60N 2/68 |
| | | | | 297/354.1 |
| 2012/0161486 A1* | 6/2012 | Stojanovic | ............... | B60N 2/12 |
| | | | | 297/354.1 |
| 2014/0021766 A1* | 1/2014 | Watanabe | .............. | B21D 53/88 |
| | | | | 297/452.18 |
| 2014/0265504 A1* | 9/2014 | Uehara | ................... | B60N 2/64 |
| | | | | 297/354.1 |
| 2019/0092199 A1* | 3/2019 | Suzuki | .................... | B60N 2/68 |

* cited by examiner

SEAT FOR VEHICLE

CLAIM OF PRIORITY

The present application claims priority from Japanese Patent Application JP2017-117271 filed on Jun. 14, 2017, the content of which are hereby incorporated by reference into this application.

BACKGROUND OF THE INVENTION

The present invention relates to seats for a vehicle, and more particularly to a seat for a vehicle having a reclining mechanism.

Some of seats for the vehicle include a seat cushion defining a seating face, a seat back defining a backrest, and a mechanism (reclining mechanism) which allows the seat back to be tilted to the seat cushion. Some of seat back frames of the seat back comprise a pipe member.

Configurations in which the reclining mechanism and the pipe member of the seat back frame are assembled to each other are disclosed in Japanese Unexamined Patent Publication Nos. 2012-30632 and 2011-230728.

The Japanese Unexamined Patent Publication No. 2012-30632 discloses that "an end portion 20b of a second corner of a pipe member is welded to a side frame 32 by butt welding" and "a recliner 40 is assembled such that rotation center thereof is aligned with axial center of a round pipe on a lower left corner of a back frame body 20".

The Japanese Unexamined Patent Publication No. 2011-230728 discloses that "a first end portion 6a of a lower frame 6 is welded to a first side frame 2 as illustrated in FIGS. 1 and 3".

SUMMARY

Configurations disclosed in Japanese Unexamined Patent Publication Nos. 2012-30632 and 2011-230728 are defined by welding the pipe member to the side frame by butt welding. In general, dimension precision of the pipe member and machining precision of the bent pipe member are different from each other. Thus, when assembling the pipe member to the side frame by welding, there is a problem that the butted part cannot be accurately butted due to the difference, and consequently welding of the butted part cannot be done or a welding defect occurs.

It is an object of the present invention to provide a seat for a vehicle, the seat allowing rotation center of a reclining mechanism and axial center of a pipe frame of a seat back to be aligned with each other and also allowing a back frame of the seat back and the pipe frame to be easily assembled to each other.

Overview of the present invention is briefly described as below.

More specifically, the seat for the vehicle includes, the seat cushion, the seat back, and the reclining device configured to allow the seat back to be tilted to the seat cushion. The seat back includes a back frame having an opening and a pipe frame comprising a pipe member, and the pipe frame includes a distal end part. The lower part of the pipe frame extends through the opening such that the distal end part is located inside a space defined by the back frame and the reclining device, and the lower part of the pipe frame is fixed to the back frame at the opening. Rotation center of the reclining device is set so as to be aligned with axial center of the lower part of the pipe frame.

According to the above seat for the vehicle, the distal end part of the lower part of the pipe frame extends through the opening such that the distal end part is located inside a space defined by the back frame and the reclining mechanism. Thus, so much high dimension precision is not required for the distal end part of the lower part of the pipe frame. This allows rotation center of the reclining mechanism and axial center of the pipe frame of the seat back to be easily aligned with each other, and also allows the seat back and the back frame to be easily assembled to each other.

DETAILED DESCRIPTION OF THE PREFERRED EMBODIMENT

Figure 1:
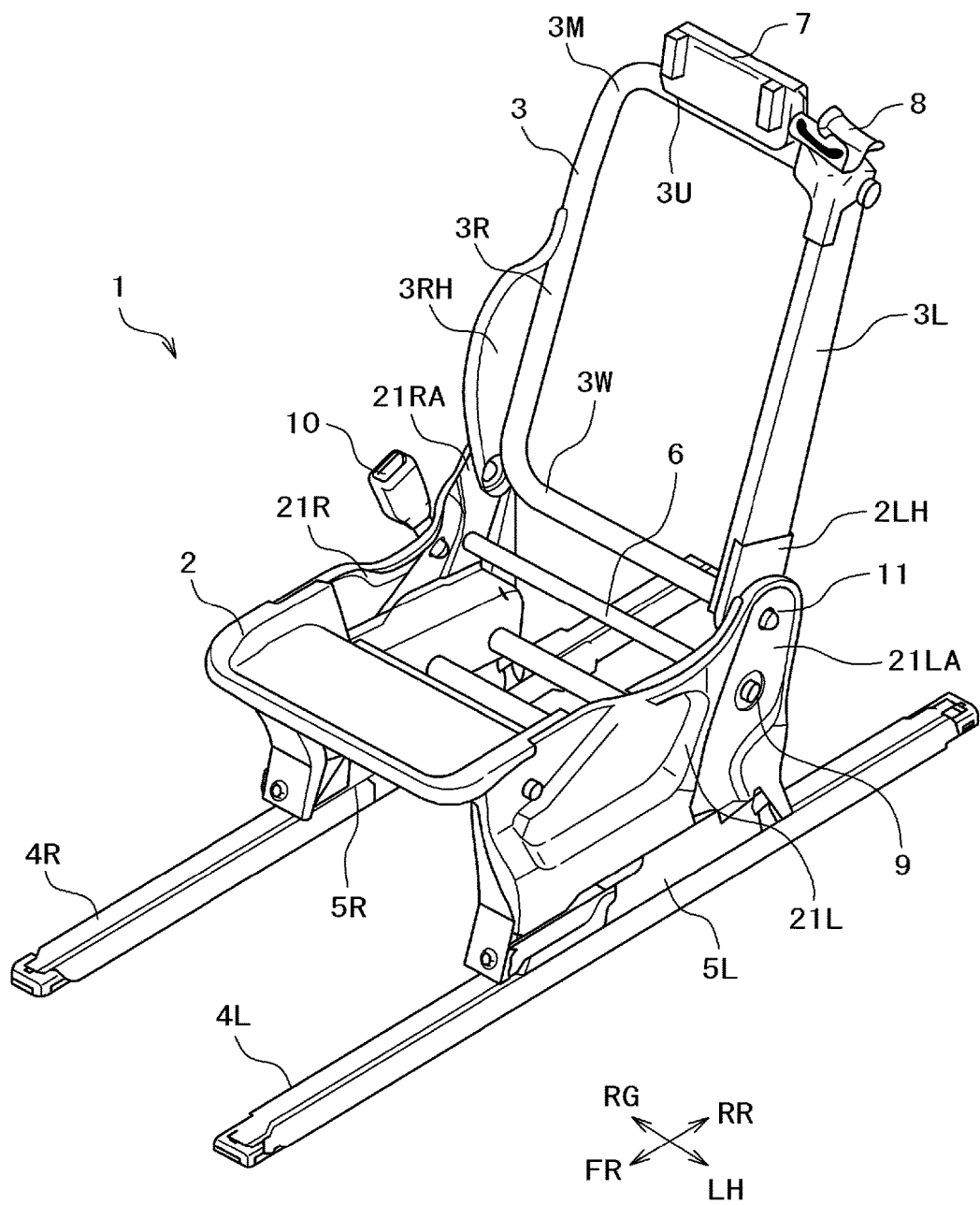
FIG. 1 is a perspective view of a seat rail and a seat for a vehicle according to the embodiment.

Hereinafter, embodiments of the present invention are described with reference to the accompanying drawings.

The disclosure is just an example of the present invention. Width, thickness, shape, and so on of components may be schematically represented compared with an actual aspect of the present invention for more clearly illustrating a drawing. However, this shall not limit interpretation of the present invention. In the description and drawings herein, same components as those described earlier with reference to another drawing are assigned with same reference numerals, and description thereof is omitted. In the drawings, arrow FR indicates the front side of the vehicle; arrow RR indicates the rear side of the vehicle; arrow LH indicates the left side of the vehicle; and arrow RG indicates the right side of the vehicle. In the description below, front, rear, up, down, right, and left have the meaning of the front side, the rear side, the up side, the down side, the left side, and the right side to the vehicle, unless otherwise specified.

EMBODIMENT

Figure 2:
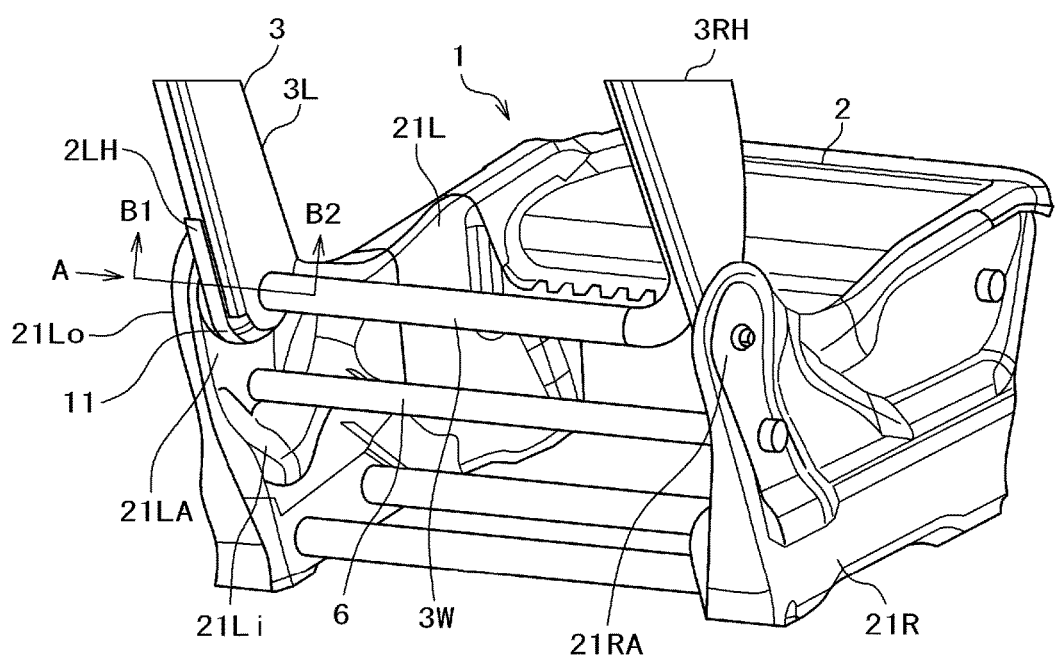
FIG. 2 is a partial perspective view of the seat of FIG. 1 viewed from the rear side.

FIG. 1 is a perspective view of a seat seal and a seat for a vehicle according to the embodiment. FIG. 2 is a partial perspective view of the seat of FIG. 1 viewed from the rear side. Hereinafter, an embodiment is described with reference to FIG. 1 and FIG. 2.

FIG. 1 illustrates a frame part of a seat 1 for a vehicle in the passenger seat installed in the cabin, and a pair of right and left seat rails which slidably support the seat 1 in the front-back direction. The seat rail includes lower seat rails 4R, 4L and upper seat rails 5R, 5L. The lower seat rail 4R and the upper seat rail 5R are right seal rails, and the lower seat rail 4L and the upper seat rail 5L are left seat rails.

In FIG. 1, a seat cover and a cushion pad constituting the seat are omitted, and a seat back frame 3 configured to support the lumbar and the back of the occupant is tiltably coupled to a rear end of a seat cushion frame 2 configured to support the buttock and the thigh of the occupant.

The seat cushion frame 2 includes a right cushion frame 21R and a left cushion frame 21L respectively on left and right sides in the vehicle width direction. The right upper seat rail (upper seat rail) 5R and the left upper seat rail 5L are respectively attached to a lower end of the right cushion frame 21R and the left cushion frame 21L by screw members or the like. The right upper seat rail 5R and the left upper seat rail 5L are slidably supported by the right lower seat rail 4R and the left lower seat rail 4L respectively.

A right hinge 21RA of the right cushion frame 21R is provided at the back side of the right cushion frame 21R, and a left hinge 21LA of the left cushion frame 21L is provided at the back side of the left cushion frame 21L. Both of the right hinge 21RA and the left hinge 21LA are coupled to each other by a pipe member 6. A left hinge bracket 2LH is attached to the left hinge 21LA. A seat back frame 3 described later is assembled to the right hinge 21RA and the left hinge bracket 2LH.

Figure 3:
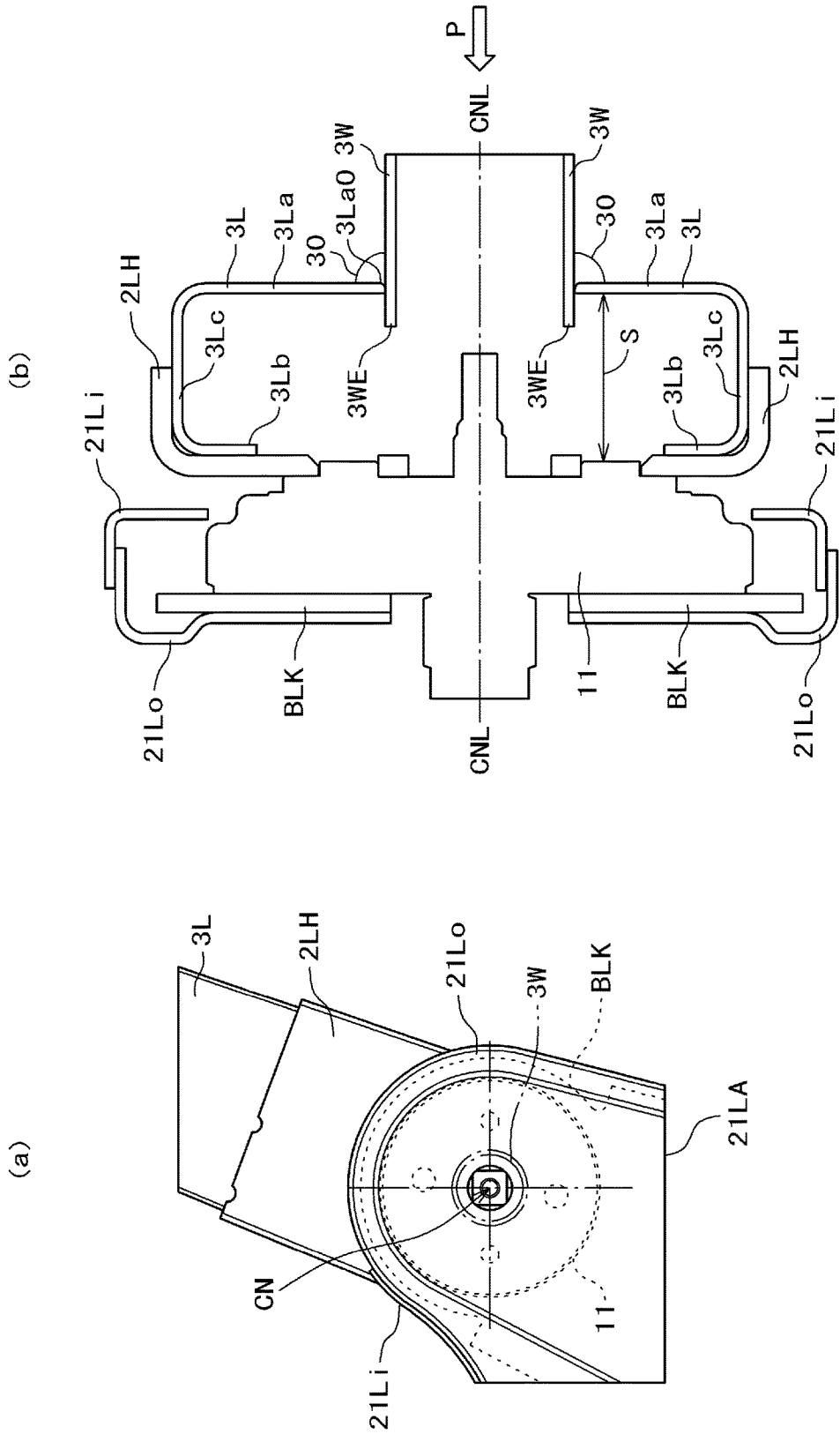
FIG. 3 illustrates relationship between a reclining device and a pipe frame of FIG. 2.

The seat back frame 3 comprises a main pipe frame 3M and a left back frame (first back frame) 3L. The main pipe frame 3M includes an upper (upper pipe frame) 3U, a lower (lower pipe frame) 3W, and a right (right pipe frame) 3R, and has a configuration integrally defined by bending one pipe member. The seat back frame 3 is formed in a substantially rectangular shape including the upper 3U, the lower 3W, the left back frame 3L, and the right (second back frame) 3R. A left end of the upper 3U of the main pipe frame 3M is attached to an upper end of the left back frame 3L by means of a securing member such as, for example, welding. The left side of the lower 3W of the main pipe frame 3M is attached to the lower side of the left back frame 3L by means of a securing member such as, for example, welding as illustrated in FIG. 3.

The seat back frame 3 also includes a right hinge bracket 3RH. The right hinge bracket 3RH is attached to the lower side of the right 3R of the main pipe frame 3M, for example, by welding, and the right hinge bracket 3RH is tiltably attached to the right hinge 21RA of the right cushion frame 21R. The lower side of the left back frame 3L is attached to the left hinge bracket 2LH of the left cushion frame 21L, for example, by welding.

As may be understood from FIG. 2, the left hinge 21LA of the left cushion frame 21L comprises an outer frame 21Lo of the left cushion frame 21L and an inner frame 21Li of the left cushion frame 21L, and a reclining device 11 described later is assembled between the left hinge bracket 2LH and the left hinge 21LA of the left cushion frame 21L.

A head rest stay fixing part 7 for supporting a head rest is provided at a center of the upper 3U of the main pipe frame 3M of the seat back frame 3.

Lower seat rails 4R, 4L comprising a metal material such as the iron are seat rails having a substantially U-shaped cross section extending substantially in the front-back direction of the vehicle, and are attached to the floor of the vehicle using a securing member such as the rivet.

The pipe member 6 is provided with a retractor of the seat belt device (not shown). The seat belt retracted from the retractor extends through a through ring fixing part 8 provided on the left side of upper 3U of the main pipe frame 3M of the seat back frame 3, and a distal end part of the seat belt is coupled to a pretensioner fixing part 9 which fixes a pretensioner (not shown) arranged at the rear side of the left cushion frame 21L. A seat belt plate extends through the middle part of the seat belt retracted from the through ring fixing part 8. The seat belt plate is configured so as to be removable from a buckle 10 provided on the right cushion frame 21R.

The reclining device 11 is provided between the left hinge 21LA of the left cushion frame 21L and the left hinge bracket 2LH in such a manner that the left hinge bracket 2LH is tiltable to the reclining device 11. The seat back frame 3 is attached to the left hinge bracket 2LH in such a manner that the seat back frame 3 is tiltable to the seat cushion frame 2. The reclining device 11 incorporates a lock mechanism which is configured to allow the seat back frame 3 to be fixed at any angle desired by the occupant.

FIG. 3 illustrates a relationship between the reclining device 11 and the lower 3W of the main pipe frame 3M illustrated in FIG. 2, in which FIG. 3A is a side view as viewed from the direction A of FIG. 2, and FIG. 3B is a cross section in the horizontal direction along a B1-B2 line of FIG. 2.

As illustrated in FIG. 3A, the reclining device 11 has a substantially circular outer shape in the vertical direction, and the cross section of the pipe member constituting the lower 3W of the main pipe frame 3M also has a substantially circular outer shape. Then, the reclining device 11 having the substantially circular outer shape and the lower 3W of the main pipe frame 3M having the substantially circular outer shape are attached to each other such that rotation center of the reclining device 11 and axial center of the lower 3W are aligned with each other. More specifically, the lower 3W of the main pipe frame 3M and the reclining device 11 are set such that axial center position of the cross section outer shape of the pipe member constituting the lower 3W and rotation center position of the reclining device 11 are aligned with each other. In FIG. 3A, the distal end part of the arrow indicated by CN represents rotation center of the reclining device 11 and axial center of the lower 3W of the main pipe frame 3M.

The left hinge 21LA of the left cushion frame 21L comprises the outer frame 21Lo of the left cushion frame 21L and the inner frame 21Li of the left cushion frame 21L, and the bracket BLK being an attaching member is provided further between the reclining device 11 and the outer frame 21Lo of the left cushion frame 21L. This attachment configuration is illustrated further in detail in FIG. 3B.

As illustrated in FIG. 3B, rotation center of the reclining device 11 and axial center of the lower 3W of the substantially circular main pipe frame 3M are attached so as to be aligned with each other as indicated by a center line CNL. The left side of the reclining device 11 is attached to an inner surface of the outer frame 21Lo of the left cushion 21L via the bracket BLK. The outer frame 21Lo of the left cushion frame 21L is fixed to the inner frame 21Li of the left cushion frame 21L at upper and lower portions thereof by means of a securing member such as welding. The right side of the reclining device 11 is fixed to an outer surface of the left hinge bracket 2LH by means of a securing member such as welding. This causes the left hinge bracket 2LH to be tiltably attached to the reclining device 11. The left hinge bracket 2LH is configured to have a substantially L-shape.

The left back frame 3L includes a first wall 3La and a second wall 3Lb, which are provided in a substantially vertical direction, and a third wall 3Lc which is provided in a substantially horizontal direction in such a manner that the third wall 3Lc coordinates with the first wall 3La and the second wall 3Lb. An inner surface of the left hinge bracket 2LH is attached to an outer surface of the second wall 3Lb and an outer surface of the third wall 3Lc of the left back frame 3L. Thus, the seat back frame 3 is slidably attached to the seat cushion frame 2 to which the reclining device 11 is attached.

The first wall 3La of the left back frame 3L includes an opening 3LaO which allows the lower 3W of the main pipe frame 3M comprising a pipe member to extend through, and the distal end part 3WE of the lower 3W of the main pipe frame 3M extends through the opening 3LaO and is fitted into the inside of the left back frame 3L. This results in a configuration where the distal end part 3WE of the lower 3W of the main pipe frame 3M is located inside a space defined by the first wall 3La, the second wall 3Lb, and the third wall 3Lc of the left back frame 3L, the left hinge bracket 2LH, and the reclining device 11. A portion of the lower 3W of the main pipe frame 3M slightly apart from the distal end part 3WE, or a portion of the lower 3W of the main pipe frame 3M corresponding to the opening 3Lao, is fixed to the first wall 3La of the left back frame 3L by means of a securing member 30 such as welding. Consequently, the lower 3W of the main pipe frame 3M comprising the pipe member is fixed to the first wall 3La of the left back frame 3L at an outer peripheral part of the pipe member, but not at the distal end part 3WE thereof.

According to the embodiment, this results in a configuration where the distal end part 3WE of the lower 3W of the main pipe frame 3M is located inside a space defined by the first wall 3La, the second wall 3Lb, and the third wall 3Lc of the left back frame 3L, the left hinge bracket 2LH, and the reclining device 11. This allows the distal end part 3WE of the lower 3W of the main pipe frame 3M to extend through and be inserted by a distance or a space indicated by arrow S into the space defined by the first wall 3La, the second wall 3Lb, and the third wall 3Lc of the left back frame 3L, the left hinge bracket 2LH, and the reclining device 11. This, therefore, means that the machining dimension precision comparable with the butt welding is not required for the distal end part 3WE of the lower 3W of the main pipe frame 3M. As a result, the lower 3W of the main pipe frame 3M and the left back frame 3L may be assembled to each other very easily.

A load of impact, which is inputted from a direction of arrow P indicated in FIG. 3B, is efficiently transferred from the lower 3W of the main pipe frame 3M to the reclining device 11 via the left back frame 3L and the left hinge bracket 2LH in the direction of the center line CNL or in a direction parallel with the direction of the center line CNL. More specifically, this enables to transfer load of impact to the reclining part without loss. This allows to reduce strength and rigidity required for the left back frame 3L and the left hinge bracket 2LH, and thereby material strength and thickness of the metal constituting the left back frame 3L and the left hinge bracket 2LH can be reduced to an extent where safety from impact can be maintained. This also allows for reduction of the production cost and mass of the seat 1.

Further, the load of impact can be transferred from the lower 3W of the main pipe frame 3M to the reclining device 11 via the left back frame 3L and the left hinge bracket 2LH in the direction of the center line CNL or in a direction parallel to the center line CNL in a stable manner. Thus, the load of impact may be transferred to a load absorbing part of the seat cushion frame 2 and the seat back frame 3 of the seat 1 in a stable manner, and thereby stability of the seat 1 as a whole during the impact test may be improved.

The present invention by the present inventors is specifically described based on the embodiment as above. However, the present invention is not limited to the above embodiment, and it is obvious that the present invention may be modified in various ways.

In the above embodiment, the seat 1 for the vehicle in the passenger seat or the left seat is described, but the present invention is not limited thereto. The present invention shall be also applicable to a seat for the vehicle in the driver seat or the right seat.

What is claimed is:

1. A seat for a vehicle, the seat comprising:
a seat cushion;
a seat back; and
a reclining device configured to allow the seat back to be tilted to the seat cushion, wherein
the seat back includes
a back frame having an opening, and
a pipe frame comprising a pipe member,
the pipe frame includes a lower part having a distal end part,
the lower part of the pipe frame extends through the opening such that the distal end part is located inside a space defined by the back frame and the reclining device,
the lower part of the pipe frame is fixed to the back frame at the opening, and
rotation center of the reclining device is set so as to be aligned with axial center of the lower part of the pipe frame.

2. The seat for the vehicle according to claim 1, further comprising:
a hinge bracket configured to couple the reclining device and the back frame with each other, and wherein the space comprising:
the reclining device; the back frame; and
the hinge bracket.

3. The seat for the vehicle according to claim 2, wherein the pipe frame further includes an upper part and side parts, and the seat back have a substantially rectangular shape defined by the lower part, the upper part, and the side parts of the pipe frame, and the back frame.

* * * * *